US010022875B1

(12) United States Patent
Cowan (10) Patent No.: US 10,022,875 B1
(45) Date of Patent: Jul. 17, 2018

(54) HAND TOOL FOR ATTRACTING AND RELEASING MAGNETICALLY ATTRACTABLE ITEMS (71) Applicant: Daniel Owen Cowan, Houston, TX (US)

(72) Inventor: Daniel Owen Cowan, Houston, TX (US)

( * ) Notice: Subject to any disclaimer, the term of this patent is extended or adjusted under 35 U.S.C. 154(b) by 0 days.

(21) Appl. No.: 15/831,938

(22) Filed: Dec. 5, 2017

Related U.S. Application Data (60) Provisional application No. 62/450,362, filed on Jan. 25, 2017.

(51) Int. Cl.
H01F 7/20 (2006.01)
B25J 15/06 (2006.01)
B25B 9/00 (2006.01)
B25B 11/00 (2006.01)
H01F 7/02 (2006.01)

(52) U.S. Cl.
CPC ............ B25J 15/0608 (2013.01); B25B 9/00 (2013.01); B25B 11/002 (2013.01); *H01F 7/0257* (2013.01)

(58) Field of Classification Search
CPC .................................................. B25J 15/0608
USPC ......................................................... 294/65.5
See application file for complete search history.

(56) References Cited

U.S. PATENT DOCUMENTS

| 4,033,589 | A | * | 7/1977 | Fernandez | A63F 3/06 273/148 R |
| 4,353,167 | A | * | 10/1982 | Martin | G01B 3/02 33/27.03 |
| 4,813,729 | A | * | 3/1989 | Speckhart | H01F 7/0257 294/65.5 |
| D346,625 | S | * | 5/1994 | Lettmoden | D21/385 |
| 5,481,813 | A | * | 1/1996 | Templeton | G01B 3/1071 33/758 |
| 6,325,433 | B1 | * | 12/2001 | Nicholson | G01V 3/15 294/65.5 |
| 6,553,636 | B1 | * | 4/2003 | Brenner | A44C 5/2038 24/334 |
| D480,095 | S | * | 9/2003 | Leon, Jr. | D15/144 |
| 7,487,600 | B1 | * | 2/2009 | Cooper | G01B 3/1056 33/770 |
| 2002/0038930 | A1 | * | 4/2002 | Leon, Jr. | B23K 9/32 269/8 |
| 2008/0076989 | A1 | * | 3/2008 | Hete | A61B 5/14552 600/323 |
| 2015/0015008 | A1 | * | 1/2015 | Mondano | A47F 13/06 294/24 |

* cited by examiner

*Primary Examiner* — Paul T Chin
(74) *Attorney, Agent, or Firm* — Eldredge Law Firm, LLC; Richard Eldredge (57) ABSTRACT

A handheld magnetic tool includes a body having a top arm and a bottom arm connected via a spring, the spring allows the top arm and the bottom arm to open and close; a magnet holder secured to a first end of the top arm; a first magnet secured to the magnet holder; a plate secured to a first end of the bottom arm to close against the first magnet; the first magnet attracts metal items to be secured to a bottom surface of the plate; and opening the top arm from the bottom arm separates the first magnet from the plate, thereby allowing the metal items to release from the plate.

10 Claims, 8 Drawing Sheets

HAND TOOL FOR ATTRACTING AND RELEASING MAGNETICALLY ATTRACTABLE ITEMS

BACKGROUND

1. Field of the Invention

The present invention relates generally to handheld tools for picking up small objects systems, and more specifically, to a handheld tool for picking up and releasing magnetic items.

2. Description of Related Art

Magnetic handheld tools are well known in the art and are effective means to pick up metal items. Commonly, handheld magnets are used to attract and pick up small metal items, such as nails, bolts, paperclips, fishhooks, and the like. One of the problems commonly associated with conventional handheld magnets is the problem of releasing the items once they are attracted to the magnet. For example, with a conventional handheld magnet, the user must manually remove each item stuck to the magnet, this can be dangerous, such as the removal of fishhooks, and can be time consuming.

Accordingly, although great strides have been made in the area of magnetic handheld tools, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional handheld magnetic tools. Specifically, the present invention provides a means to pick up metallic items with a magnet and easily release the items in a desired location. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1:
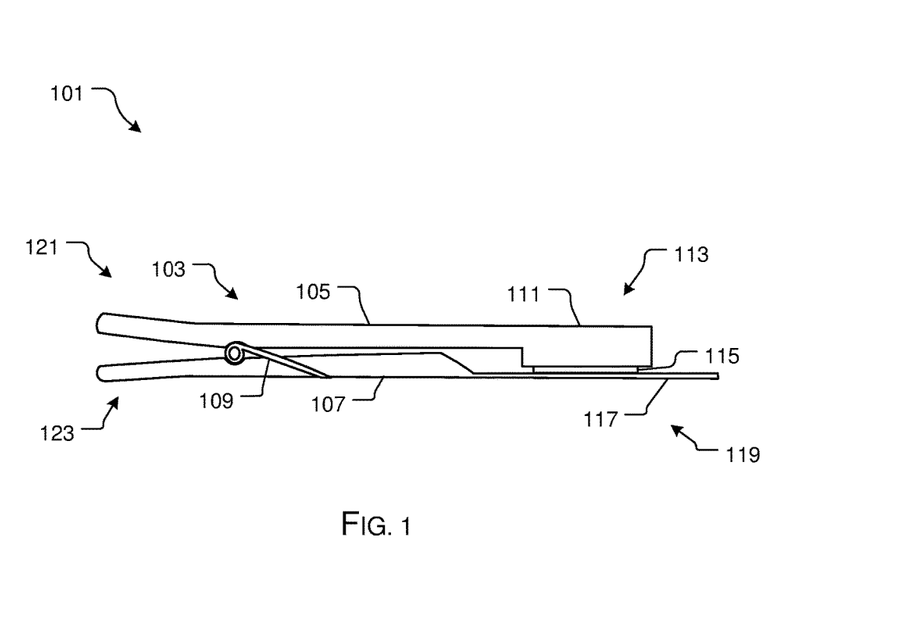
FIG. 1 is a side view of a magnetic handheld tool in accordance with a preferred embodiment of the present application.

Referring now to the drawings wherein like reference characters identify corresponding or similar elements throughout the several views, FIG. 1 depicts a side view of a handheld magnetic tool 101 in accordance with a preferred embodiment of the present application. It will be appreciated that tool 101 overcomes one or more of the above-listed problems commonly associated with conventional magnetic tools.

Figure 3:
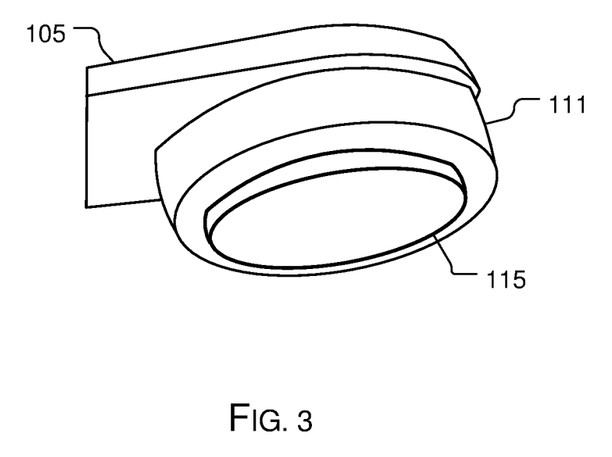
FIG. 3 is an oblique view of a magnet holder from FIG. 1.

In the contemplated embodiment, tool 101 includes a body 103 having a top arm 105 and a bottom arm 107 connected by a hinging device 109. In the preferred embodiment, device 109 is a spring configured to allow the arms to open and close in a similar fashion to a clothespin. It should be appreciated that the size and materials of arms 107, 109 can vary. Tool 101 further includes a magnet holder 111 secured to arm 105 at a first end 113. Magnet holder 111 is configured to contain one or more magnets 115. It should be appreciated that the number and strength of one or more magnets 115 can vary. In addition, it is contemplated that magnet 115 can be integral to or removable from magnet holder 111.

In the preferred embodiment, arm 107 includes a plate 117 secured to a first end 119, wherein plate 117 is positioned underneath magnet 115. It should be appreciated that plate 117 could be flat or alternatively could have a rim around the edge to protect the magnet or to add strength to the plate.

Figure 2A:
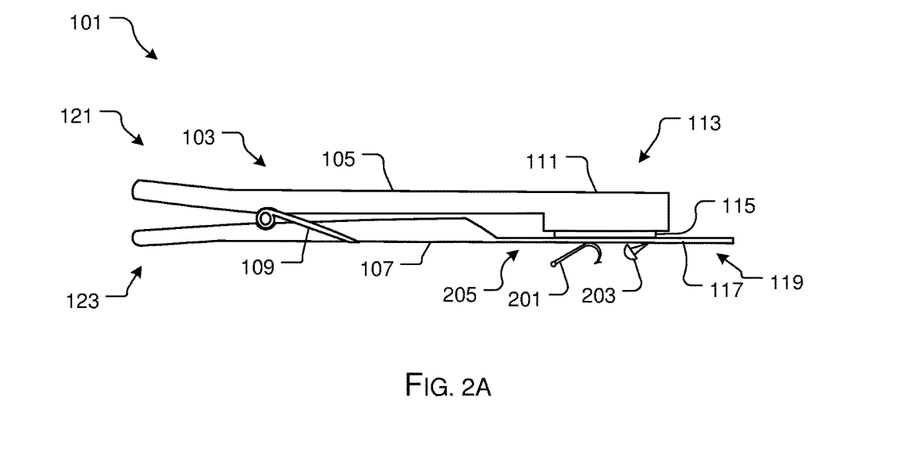
FIGS. 2A and 2B are side views of the magnetic handheld tool of FIG. 1 in closed and open positions respectively.
Figure 2B:
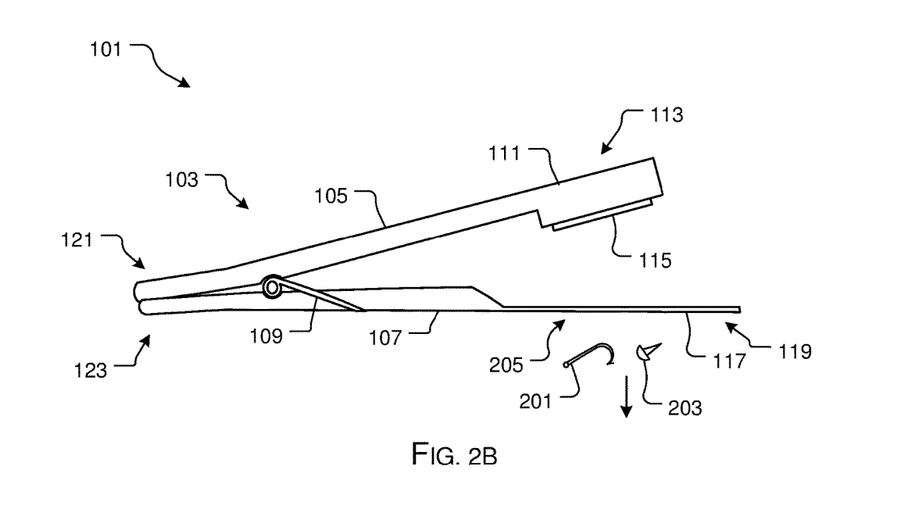

As shown in FIGS. 2A and 2B, when arms 105 and 107 are in a closed position, magnet 115 attracts metal items 201, 203 to secure to a bottom surface 205 of plate 117. When ends 121, 123 of arms 105, 107 are pressed together, magnet 115 is separated from plate 117, allowing for items 201, 203 to fall, as shown with arrow A.

It should be appreciated that one of the unique features believed characteristic of the present application is the use of plate 117 positioned between the magnet 115 and the items to be picked up. It should be understood that this feature allows for the items to be dropped conveniently in a desired location by opening the arms to distance the magnet from the plate.

Figure 4:
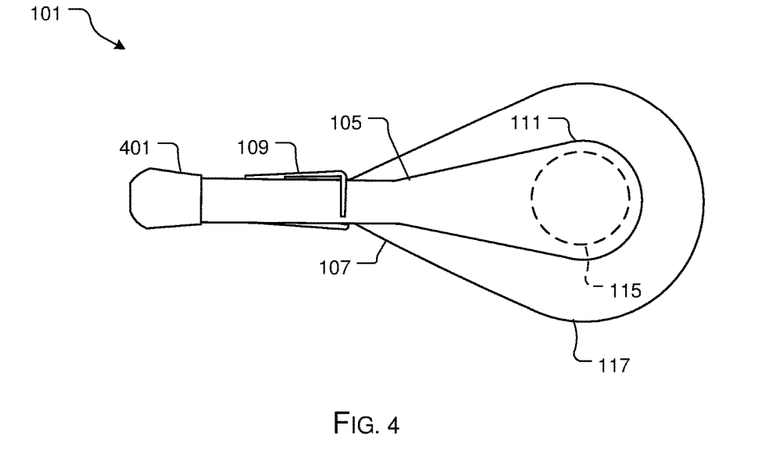
FIG. 4 is a top view of the magnetic handheld tool of FIG. 1.

In FIG. 4 a top view of tool 101 is shown. In the preferred embodiment, plate 117 is substantially larger than magnet holder 111, thereby blocking metal items from coming into contact with the magnet directly. As further shown in FIG. 4, it is contemplated that one or more pads 401 can be secured to arms 105, 107 to provide additional comfort and grip for the user.

Figure 5A:
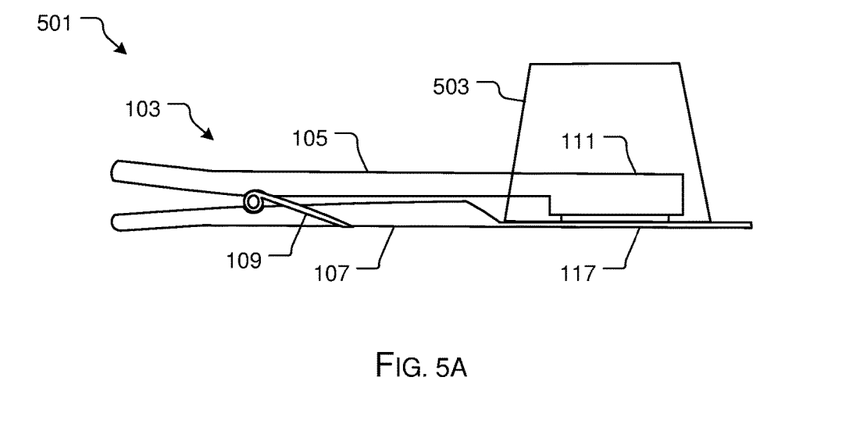
FIGS. 5A and 5B are side views of a magnetic handheld tool in accordance with an alternative embodiment of the present application.
Figure 5B:
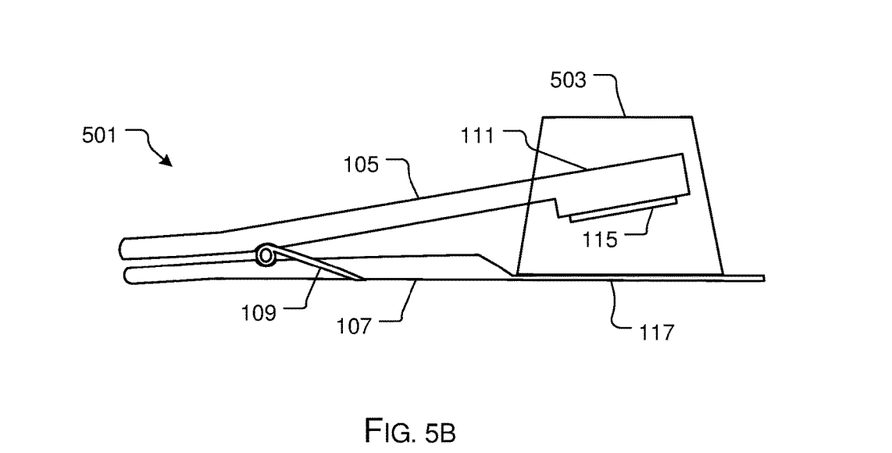
Figure 6:
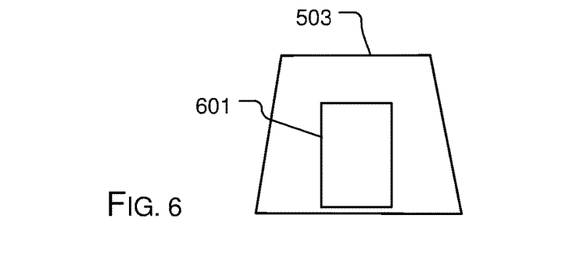
FIG. 6 is side view of a cover of FIGS. 5A and 5B.

In FIGS. 5A and 5B side views demonstrate an alternative embodiment of a handheld magnetic tool 501 in accordance with the present invention. Tool 501 includes all of the features associated with tool 101, and further includes a magnet cover 503 configured to secure over the top of magnet cover 111 and magnet 115. In the preferred embodiment, the cover 503 secures to plate 117, and has a slot 601 (as shown in FIG. 6) to allow arm 105 to move. It should be understood that cover 503 further prevents metal items from coming into contact with magnet 115.

Figure 7:
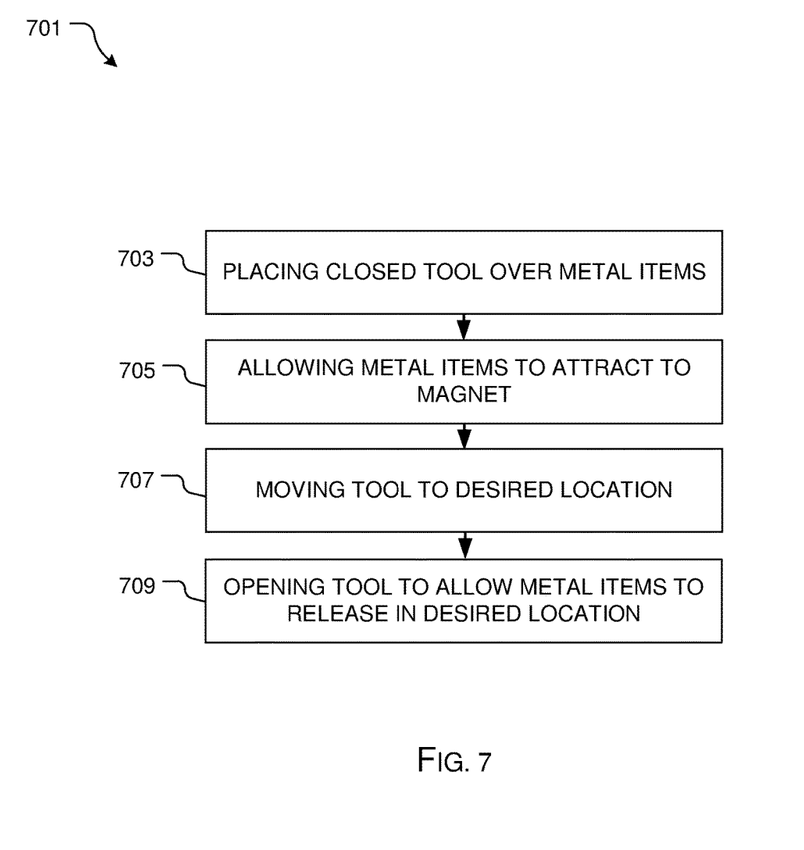
FIG. 7 is a flowchart of a method of use of the tools of FIG. 1 and FIGS. 5A and 5B.

In FIG. 7, a flowchart 701 depicts a method of use associated with tools 101 and 501. The user places the closed tool over one or more metal items, thereby allowing for the metal items to attract to and stick to the plate, as shown with boxes 703, 705. The items will remain in place until the user moves the tool to a desired location and opens the tool, thereby allowing the items to be released in the location, as shown with boxes 707, 709.

Figure 8A:
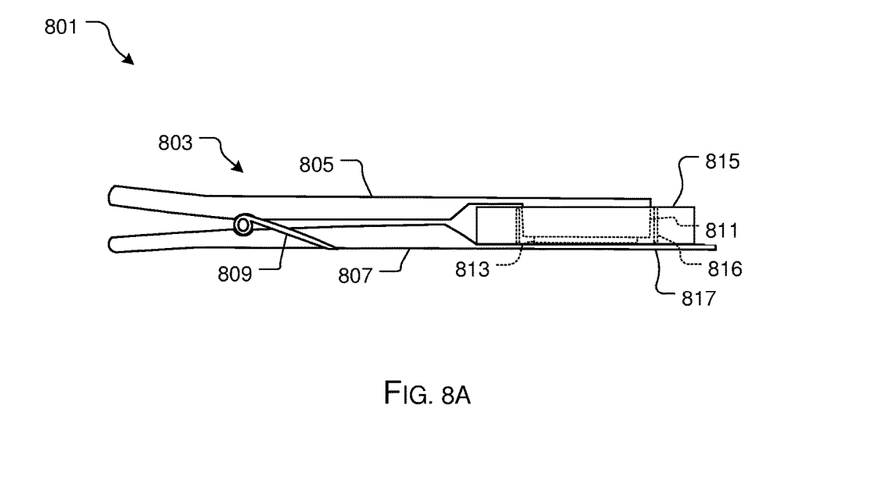
FIGS. 8A and 8B are side views of an alternative embodiment of a magnetic handheld tool in accordance with the present application.
Figure 8B:
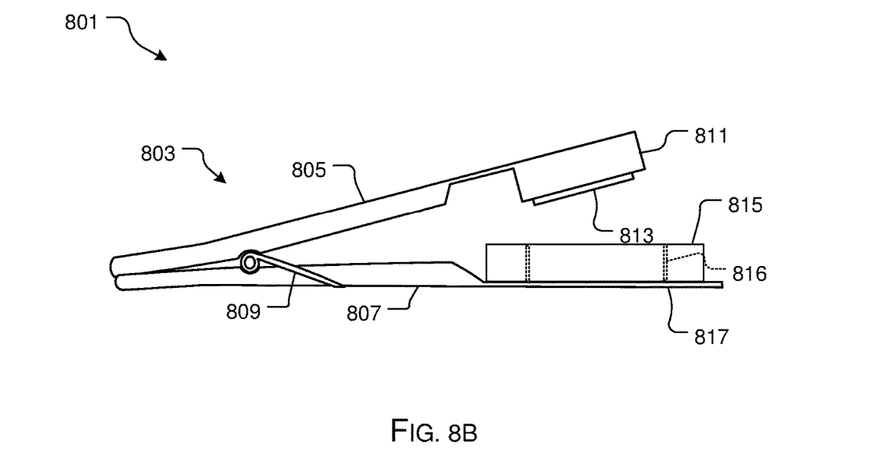
Figure 9:
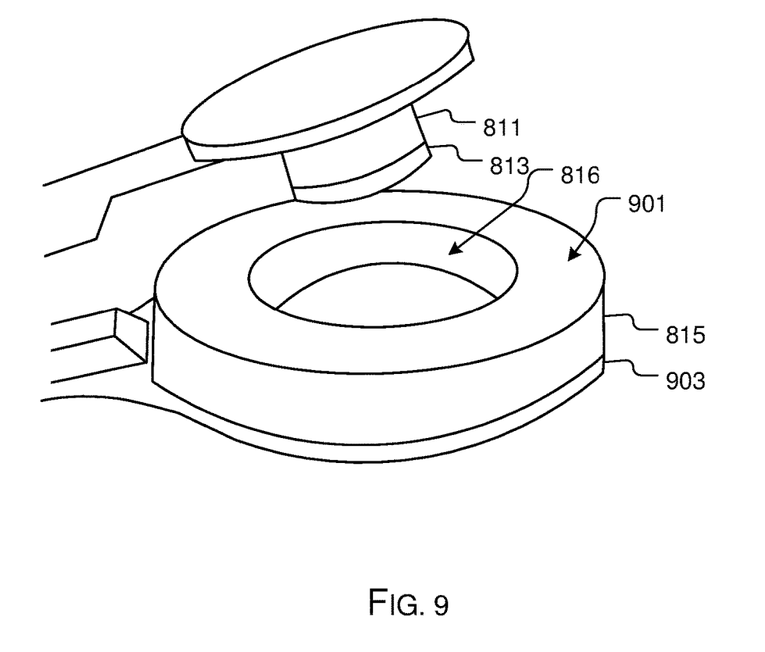
FIG. 9 is an oblique view of the magnetic handheld tool of FIGS. 8A and 8B.

In FIGS. 8A and 8B, an alternative embodiment of a magnetic handheld tool 801 is shown having similar form and features to tool 101. Tool 801 includes a body 803 having a top arm 805 and a bottom arm 807 connected by a hinging device 809, thereby allowing tool 801 to open and close. Tool 801 further includes a magnet holder 811 and a magnet 813 configured to open and close from a cylinder 815 secured to or integral with a plate 817. Cylinder 815 is configured with an inner cavity 816 to surround magnet 813, thereby protecting the magnet and reducing unwanted attraction of objects to the magnet. In FIG. 9, an oblique view of tool 801 is shown. Cylinder 815 includes a top 901 and a base 903, wherein top 901 provides access to cavity 816. It should be appreciated and understood that cylinder 815 can be one solid piece, having cavity 816 removed from the center. Alternatively, multiple cylinders could be combined, one inside the other to create the cavity.

It should be appreciated that tools 101, 501, and 801 can be primarily composed of wood, plastic, or any other structural material. In addition, the size of tools 101 and 501 can vary as aesthetical, functional, or manufacturing considerations require.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A handheld magnetic tool, comprising:
a body having a top elongated arm extending from a first top end to a second top end and a bottom elongated arm extending from a first bottom end to a second bottom end, the top elongated arm and the bottom elongated arm are connected via a hinging device secured near the first top end and near the first bottom end, the hinging device is a spring, wherein the hinging device allows the top arm and the bottom arm to open and close relative to each other;
a magnet holder secured to second top end of the top elongated arm;
a first magnet secured to the magnet holder;
a plate secured to the second bottom end of the elongated bottom arm and configured to come in contact against the first magnet;
a cylinder body protruding from a top surface of the second end of the elongated bottom arm, the cylinder body forming an inner cavity that receives the magnet holder and the first magnet therein;
wherein the first magnet attracts metal items to be secured to a bottom surface of the plate; and
wherein opening the top arm from the bottom arm separates the first magnet from the plate, thereby allowing the metal items to release from the plate.

2. The handheld magnetic tool of claim 1, further comprising a second magnet secured to the magnet holder, wherein the first and second magnets create a combined magnetic force to attract the metal items.

3. The handheld magnetic tool of claim 1, further comprising:
a pad secured to a second end of the top arm;
wherein the pad provides a grip for the user.

4. The handheld magnetic tool of claim 1, further comprising:
a cover configured to secure over the magnet holder;
wherein the cover prevents metallic items from securing to a top and a plurality of sides of the first magnet.

5. The handheld magnetic tool of claim 1, wherein the body is composed of plastic.

6. The handheld magnetic tool of claim 1, wherein the body is composed of wood.

7. The handheld magnetic tool of claim 1, wherein the cylinder body comprises:
a first cylinder; and
a second cylinder;
wherein the first is disposed within the second to create the central cavity.

8. The handheld magnetic tool of claim 1, wherein the plate includes a rim extending from the edge of the plate.

9. The handheld magnetic tool of claim 1, wherein the body is composed of an aluminum.

10. A method of picking up metal items, comprising:
   providing the handheld magnetic tool of claim 1;
   moving the handheld magnetic tool over one or more magnetic items, wherein the plate comes into contact with the one or more magnetic items; and
   releasing the one or more magnetic items by opening the top arm and the bottom arm.

* * * * *